(12) United States Patent
Bopp et al.

(10) Patent No.: US 12,643,664 B2
(45) Date of Patent: Jun. 2, 2026

(54) AIRCRAFT PASSENGER SEAT

(71) Applicant: ZIM AIRCRAFT SEATING GMBH, Immenstaad am Bodensee (DE)

(72) Inventors: Metin Albert Bopp, Tettnang (DE); Alper Altunbas, Uhldingen-Mühlhofen (DE)

(73) Assignee: Zim Aircraft Seating GmbH, Immenstaad am Bodensee (DE)

( * ) Notice: Subject to any disclaimer, the term of this patent is extended or adjusted under 35 U.S.C. 154(b) by 0 days.

(21) Appl. No.: 19/077,223

(22) Filed: Mar. 12, 2025

(65) Prior Publication Data

US 2025/0269965 A1     Aug. 28, 2025

Related U.S. Application Data

(63) Continuation of application No. PCT/EP2023/081113, filed on Nov. 8, 2023.

(30) Foreign Application Priority Data

Nov. 8, 2022     (DE) ..................... 10 2022 129 527.3

(51) Int. Cl.
    B64D 11/06          (2006.01)
(52) U.S. Cl.
    CPC .................................. B64D 11/064 (2014.12)
(58) Field of Classification Search
    CPC .................................................... B64D 11/064
    USPC ......................................................... 297/337
    See application file for complete search history.

(56) References Cited

U.S. PATENT DOCUMENTS

| | | | | | |
|---|---|---|---|---|---|
| 3,329,463 | A | * | 7/1967 | Zimmermann ........ | B61D 33/00 |
| | | | | | 297/243 X |
| 6,609,753 | B2 | | 8/2003 | Schmidt-Schaeffer | |
| 8,128,167 | B2 | * | 3/2012 | Zhong ..................... | B60N 2/62 |
| | | | | | 297/284.11 |

(Continued)

FOREIGN PATENT DOCUMENTS

| | | | | | |
|---|---|---|---|---|---|
| DE | | 4114735 | A1 | * 11/1992 | ............... B60N 2/62 |
| EP | 1 207 074 | B1 | | 6/2006 | |

(Continued)

OTHER PUBLICATIONS

German Search Report (Application No. 10 2022 129 527.3) dated Oct. 19, 2023 (7 pages).

(Continued)

*Primary Examiner* — Anthony D Barfield
(74) *Attorney, Agent, or Firm* — BURR PATENT LAW, PLLC

(57)          ABSTRACT

Aircraft passenger seat having a frame, a seat surface group and a backrest element. The seat surface group has a seat surface element that provides a seat surface on which a user of the aircraft passenger seat can directly sit. The seat surface group has a winding element and a first winding shaft. A first end of the winding element is connected to the first winding shaft, which is rotatable about a first winding axis. As the first winding shaft rotates around the first winding axis, the winding element can be wound up onto the first winding shaft or can be unwound from the first winding shaft in the region of the first end of the winding element. The seat surface element is connected to the winding element so that the seat surface element is moved as the first winding shaft rotates.

14 Claims, 4 Drawing Sheets

(56)                 References Cited

U.S. PATENT DOCUMENTS

| | | |
|---|---|---|
| 2010/0308167 A1 | 12/2010 | Hawkins et al. |
| 2013/0320730 A1* | 12/2013 | Aselage .............. B60N 2/0284 |
| | | 297/337 X |
| 2019/0233119 A1 | 8/2019 | Oleson et al. |
| 2021/0179274 A1 | 6/2021 | Lueck et al. |

FOREIGN PATENT DOCUMENTS

| | | |
|---|---|---|
| FR | 2 521 412 A | 8/1983 |
| GB | 2569289 A | 6/2019 |
| WO | 01/89442 A1 | 11/2001 |
| WO | 2014/137204 A1 | 9/2014 |
| WO | 2019/197329 A1 | 10/2019 |
| WO | 2020/041616 A1 | 2/2020 |

OTHER PUBLICATIONS

International Search Report and Written Opinion (Application No. PCT/EP2023/081113) dated Feb. 12, 2024 (18 pages).
International Preliminary Examination Report (with Chapter II Claims) (Application No. PCT/EP2023/081113) dated Jul. 15, 2024 (with English translation) (22 pages).

* cited by examiner

AIRCRAFT PASSENGER SEAT

CROSS REFERENCE TO RELATED APPLICATIONS

This application is a continuation of International Application No. PCT/EP2023/081113 filed Nov. 8, 2023, which designated the United States, and claims the benefit under 35 USC § 119(a)-(d) of German Application No. 10 2022 129 527.3 filed Nov. 8, 2022, the entireties of which are incorporated herein by reference.

FIELD OF THE INVENTION

The present invention relates to an aircraft passenger seat.

BACKGROUND OF THE INVENTION

For equipping passenger aircraft, in particular long-haul aircraft, aircraft passenger seats having one or more seats are known in a large number of embodiments.

A seat has a seat base and, in most cases, also a backrest, wherein on a seat of an aircraft passenger seat different seating positions can almost always be adjusted by means of positional changes of the seat base, the backrest and often both components. As a result, passengers can change freely between active seating postures in an "upright position", for example, in order to consume meals or for the take-off and landing, and passive seating postures in a "reclined position", for example, in order to relax and sleep.

In particular, different solutions for movements of the seat base and/or the backrest are known. As a result of a movement of the seat base and/or the backrest, seat adjustments can be predetermined which, for example, impair the movement space to the least possible extent, the so-called "living space" of adjacent airline passengers, in particular, in a seat row located behind.

As a result of the requirement in air traffic to configure seat devices to be as lightweight as possible and to make best possible use of the available "living space" of a user, the construction of aircraft passenger seats which can be comfortably adjusted, are comparatively lightweight, comparatively cost-effective and at the same time stable presents a specific challenge.

SUMMARY OF THE INVENTION

An object of the present invention is to provide an improved aircraft passenger seat, in particular, to provide an aircraft passenger seat which has an improved comfort function.

The present invention is based on an aircraft passenger seat, wherein the aircraft passenger seat has a surround, a seat face group and a backrest element, wherein the seat face group has a seat face element, wherein the seat face element provides a seat face, on which a user of the aircraft passenger seat can sit directly, wherein the seat face group has a winding element and a first winding shaft, wherein a first end of the winding element is connected to the first winding shaft, wherein the first winding shaft is provided so as to be able to be rotated about a first winding axis, wherein, when the first winding shaft is rotated about the first winding axis, the winding element is provided in the region of the first end of the winding element so as to be able to be wound on the first winding shaft or to be unwound from the first winding shaft, wherein the seat face element is connected to the winding element so that, when the first winding shaft is rotated, the seat face element is moved. An aircraft passenger seat having a comparatively comfortable seat face is thereby produced, in particular, a comparatively lightweight and/or cost-effective aircraft passenger seat is thereby produced with a comparable comfort function.

Direction references mentioned below advantageously refer to the seat direction of the aircraft passenger seat. For example, the seat direction of the aircraft passenger seat when the aircraft passenger seat is in the state arranged in the aircraft is also the flying direction of the aircraft.

For example, the surround is provided for securing to a base on an aircraft passenger cabin. For example, the surround has a seat divider and bars which extend transversely relative to the seat direction, wherein the seat divider is retained by the bars. For example, the surround has two seat dividers. It is conceivable for the two seat dividers to be connected to each other by means of one bar. It is also conceivable for the seat dividers to be provided to secure the aircraft passenger seat to the base of an aircraft passenger cabin. The surround comprises, for example, an, in particular, fixed housing of the backrest element. The housing is, for example, in the form of a backrest shell. As a result of the backrest shell, for example, an expansion of the aircraft passenger seat, for example, counter to a seat direction, is secured in a rear region, in particular, in a non-changeable manner.

For example, the seat face element is configured to provide a seat face for a user and the backrest element is configured to provide a leaning face for a back of a user of the aircraft passenger seat. For example, the seat face element is in the form of a seat shell or a seat cushion.

For example, the seat face element is connected to the winding element in a non-releasable manner. For example, the seat face element is adhesively bonded, riveted or sewn to the winding element. However, it is also conceivable for the seat face element to be connected to the winding element in a releasable manner. For example, the seat face element is releasably connected to the winding element by means of a hook and loop connection. It is also conceivable for the seat face element to be releasably connected to the winding element by means of a hook connection.

For example, the seat face group has a second winding shaft. It is also conceivable for the first and the second winding shaft to be provided spaced apart from each other, wherein a second end of the winding element is connected to the second winding shaft, wherein the first and the second end of the winding element are provided opposite and spaced apart from each other.

For example, the aircraft passenger seat has a backrest. It is conceivable for the backrest to comprise the backrest element. For example, the backrest or the backrest element has a frame. It is conceivable for the frame to be connected to the surround. For example, the frame is provided so as to be non-movable and/or fixed in position with respect to the surround. It is also conceivable for the frame to be in the form of a dimensionally stable element.

For example, the first winding axis of the first winding shaft extends transversely relative to the seat direction. For example, the first winding axis is orientated parallel with a longitudinal axis of the bar. It is conceivable for the first winding shaft to be connected to a seat divider. It is conceivable for the first winding shaft to be movably supported on a seat divider. For example, the first winding shaft connects two seat dividers to each other. For example, the first winding shaft connects the two seat dividers of the aircraft passenger seat to each other.

It is conceivable for the first and/or the second winding shaft to be formed below the seat face element. It is conceivable for the first and/or the second winding shaft to be provided at a side, opposite the seat face, of the seat face element.

For example, the aircraft passenger seat is configured in such a manner that a movement of the seat face element is carried out parallel with the seat direction. For example, the movement of the seat face element is a purely linear movement. It is also conceivable for the movement of the seat face element to be in the form of a pivoting/sliding movement.

For example, the seat face element and the winding element are connected to each other at a connection region. It is conceivable for the connection region to be provided as a face on which the seat face element and the winding element are adjacent to each other. It is conceivable for this planar connection region to carry out a linear movement in the direction of the surface extent of the connection region during a rotation of the first winding element.

It is also proposed that the second winding shaft be provided so as to be able to be rotated about a second winding axis, wherein the first and the second winding shafts are coupled to each other so that, when the first winding shaft is rotated, as a result of the coupling of the winding shafts a rotation of the second winding shaft is brought about or vice versa. A comparatively stable mechanism is thereby provided.

For example, the second winding axis of the second winding shaft extends transversely relative to the seat direction. For example, the second winding axis is orientated parallel with a longitudinal axis of the bar. It is conceivable for the second winding shaft to be connected to a seat divider. It is conceivable for the second winding shaft to be movably supported on a seat divider. For example, the second winding shaft connects two seat dividers to each other. For example, the second winding shaft connects the two seat dividers of the aircraft passenger seat to each other. It is conceivable for the first and the second winding shaft to be provided in a state orientated parallel with each other.

For example, the first and the second winding shafts are spaced apart from each other in the seat direction and/or in the flight direction. For example, the first and the second winding shafts are provided in a state spaced apart from each other in the seat direction and/or in the flight direction. For example, the first and the second winding shafts are located in one winding shaft plane. For example, the winding shaft plane is provided in a state orientated horizontally.

For example, the first and/or the second winding shaft are rotatably supported on the surround. It is conceivable for a rotary bearing to be provided, by means of which the first and/or the second winding shaft are provided in a rotatably supported manner. For example, the rotary bearings are arranged to be fixed in position with respect to each other on the surround. It is conceivable for the rotary bearings to be secured so as to be fixed in position on the surround.

For example, a rotation range of the first and/or the second winding shaft about the first and/or the second winding axis is limited. For example, there is provided a stop which limits a rotation of the first and/or the second winding shaft. It is conceivable for the stop to be arranged on the surround. For example, the first winding shaft and/or the second winding shaft can be moved back and forth in a rotation range of 450°, 360°, 270°, 180°, 90° or 45°. For example, the rotation range of the first winding shaft and/or the second winding shaft is in a range from 30° to 450°, for example, in a range from 45° to 360°, for example, in a range from 45° to 270°.

For example, the winding element is connected with a second end of the winding element to the second winding shaft. For example, the first and the second winding shaft are coupled to each other by means of the winding element. It is conceivable for a movement of the first winding shaft via the winding element to be coupled to a movement of the second winding shaft. For example, a movement of the first and second winding shaft is synchronized by means of the winding element. It is also conceivable for the winding element to be connected with the second end to the surround. For example, the second end of the winding element is arranged to be fixed in position on the surround. It is conceivable for the second end of the winding element to be arranged directly on the surround.

It is conceivable for the first and the second winding shafts to rotate in the same direction. For example, the first and the second winding shafts are connected by means of the winding element in such a manner that winding of the winding element on the first winding shaft brings about unwinding of the winding element from the second winding shaft. It is also conceivable for the first and the second winding shaft to be coupled to each other in such a manner that the first and the second winding shafts rotate in opposing rotation directions.

It is further proposed that the winding element be in the form of a cloth or in the form of a strip. The winding element is thereby configured in a comparatively cost-effective manner. For example, the winding element is thereby configured in a comparatively robust manner.

For example, the winding element is made from a material, from a woven fabric or a textile. It is also conceivable for the winding element to be made from a plastics material, for example, from a resilient plastics material. For example, the winding element is produced from a rubber. It is conceivable for the winding element to be provided in a resilient manner so that a length of the winding element can be changed by winding or unwinding the winding element onto or from the first winding shaft. However, it is also conceivable for an expansion, for example, a length or a width of the winding element, not to be able to be changed. For example, the winding element is configured in a non-resilient manner in an extension direction.

For example, at a first end of the winding element a welt is provided. It is conceivable that a first welt strip is formed or arranged at the first end of the winding element. It is also conceivable for a welt to be provided at the second end of the winding element. It is conceivable for a second welt strip to be formed or arranged at the second end of the winding element. For example, a spacing of the welt strip at the first end of the winding element from the welt strip at the second end of the winding element cannot be changed.

It is also proposed that the first winding shaft have a slot and the winding element be provided in a state pushed onto the slot of the first winding shaft in the form of a tongue and groove connection with the first end of the winding element. The winding element can thereby be connected to the first winding shaft in a comparatively simple and secure manner.

It is conceivable for the second winding shaft to have a slot. It is conceivable for the winding element to be pushed onto or into the slot of the first winding shaft with the first welt strip. It is conceivable for the winding element to be pushed onto or into the slot of the second winding shaft with the second welt strip. For example, the slot of the winding shaft and the welt strip form a tongue and groove connection.

It is further proposed that a spacing of the first winding shaft from the second winding shaft be provided so as to be non-changeable. It is conceivable for a spacing of the first winding axis from the second winding axis to be constant in a direction transverse relative to the winding axis extents. It is conceivable for the first and the second winding axes to be provided so as to be orientated parallel with each other.

It is further proposed that the aircraft passenger seat have a locking element, wherein a movement of the first winding shaft and/or a movement of the second winding shaft can be blocked by the locking element. The aircraft passenger seat can thereby be secured, for example, in the take-off and landing position.

For example, the locking element is in the form of a lever. It is conceivable for the locking element to engage in the slot of the first and/or the second winding shaft and thereby to secure the winding shaft in a rotationally secure manner. For example, the locking element is coupled to a rotary bearing of the first and/or the second winding shaft so that a locking of the rotary bearing can be carried out.

It is also proposed that the first winding shaft be provided so as to be able to be rotated about the first winding axis from a starting position into an intermediate position, wherein the aircraft passenger seat has a resilient element, wherein the first winding shaft is acted on by the resilient element with a resilient force of the resilient element so that the first winding shaft can be moved by the resilient force of the resilient element from the intermediate position back into the starting position. The comfort function of the aircraft passenger seat is thereby comparatively increased.

For example, the aircraft passenger seat is located in the starting position in the "upright position". For example, the aircraft passenger seat is located in the intermediate position in a "reclined position". The aircraft passenger seat is located in the "upright position", for example, during the take-off and landing operation. In the "reclined position" of the aircraft passenger seat, the aircraft passenger can assume a comparatively relaxed "lying position", for example, in a time between the take-off and landing operation.

For example, the resilient element is in the form of a helical spring or a leg spring. For example, a rotation position of the first winding shaft in the starting position and a rotation position of the first winding shaft in the intermediate position corresponds to a value between 30° and 450°. For example, the first winding shaft can, starting from the starting position, be rotated about the first winding axis up to the intermediate position through from 30° to 450°.

It is also proposed that the seat face element be releasably connected to the winding element. A comparatively simple maintenance of the aircraft passenger seat can thereby be brought about.

For example, the winding element extends from the first winding shaft to the second winding shaft along a winding element surface-area. It is conceivable for the seat face element to be connected to the winding element over a surface-area of less than 90% of the winding element surface-area. For example, the seat face element is connected to the winding element over a surface-area of less than 70% of the winding element face.

For example, the aircraft passenger seat is configured in such a manner that, as a result of a movement of a person sitting on the seat face, a movement of the seat face element can be produced. It is conceivable that, as a result of a movement of a person, a movement of the seat face and consequently a movement of the first winding shaft is carried out.

For example, the aircraft passenger seat has an operating element which is coupled to the first winding shaft. For example, as a result of a movement or operation of the operating element, a rotation of the first winding shaft can be produced. It is conceivable for the operating lever to be in the form of a rotary wheel or a lever. For example, the operating lever is directly connected to the first winding shaft. It is also conceivable for the operating lever to be coupled to the first winding shaft by means of a movement mechanism.

It is further proposed that a pulling apparatus be provided, wherein the pulling apparatus is configured to adjust the backrest element of the backrest, wherein the pulling apparatus has an adjustment element, wherein the adjustment element is connected to a winding shaft, for example, the first winding shaft, wherein during a rotational movement of the winding shaft the adjustment element is wound onto the shaft or unwound, wherein, as a result of the winding operation of the adjustment element, a position of the backrest element is changed. A comparatively simple adjustability of the backrest element is thereby produced. For example, the adjustment of the backrest element can thereby be coupled to an adjustment of the seat face element.

An exemplary embodiment of the present invention is a seat row having an aircraft passenger seat according to one of the preceding embodiments.

A further exemplary embodiment of the present invention is an aircraft having an aircraft passenger seat according to one of the above-mentioned embodiments or a seat row according to one of the above-mentioned embodiments.

BRIEF DESCRIPTION OF THE DRAWINGS

Other features and advantages of the present invention are explained in greater detail with reference to schematically shown exemplary embodiments.

DETAILED DESCRIPTION OF THE INVENTION

Figure 1:
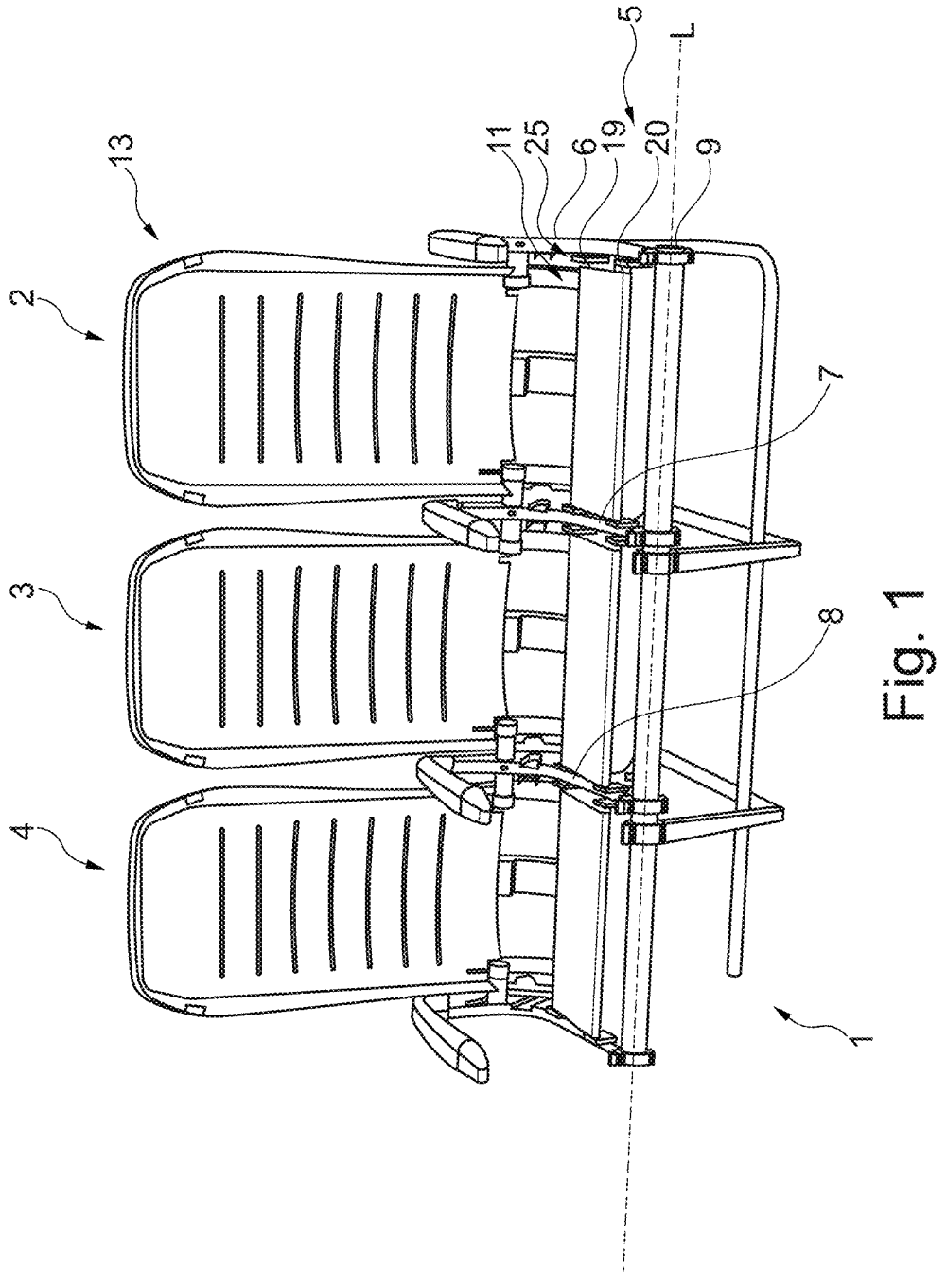
FIG. 1 shows an aircraft passenger seat row as a schematic illustration obliquely from the top front side.
Figure 2:
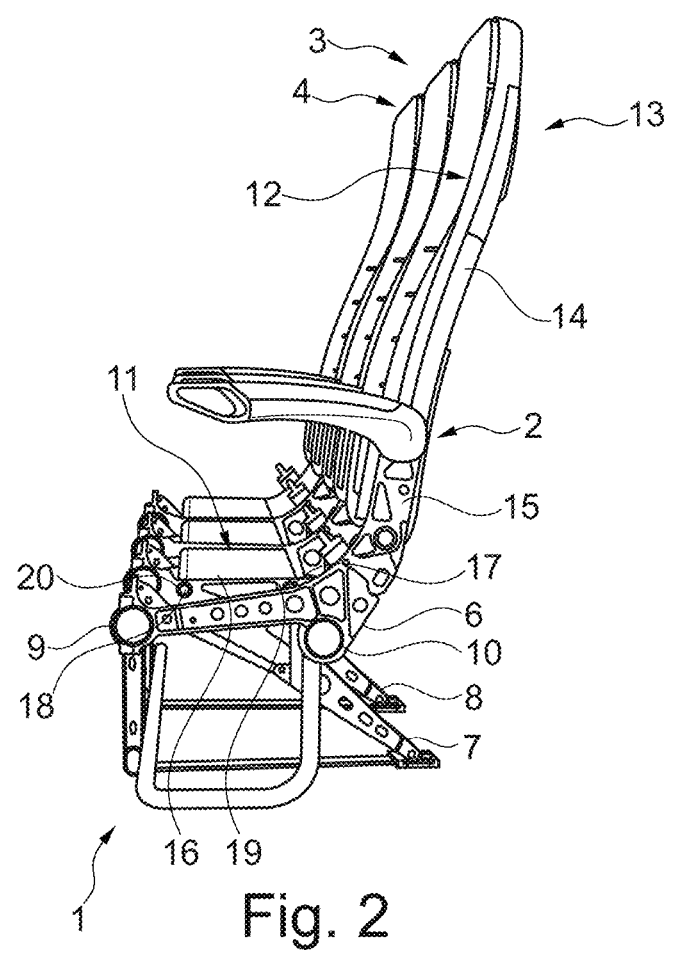
FIG. 2 shows the aircraft passenger seat row according to FIG. 1 as a side view.
Figure 3:
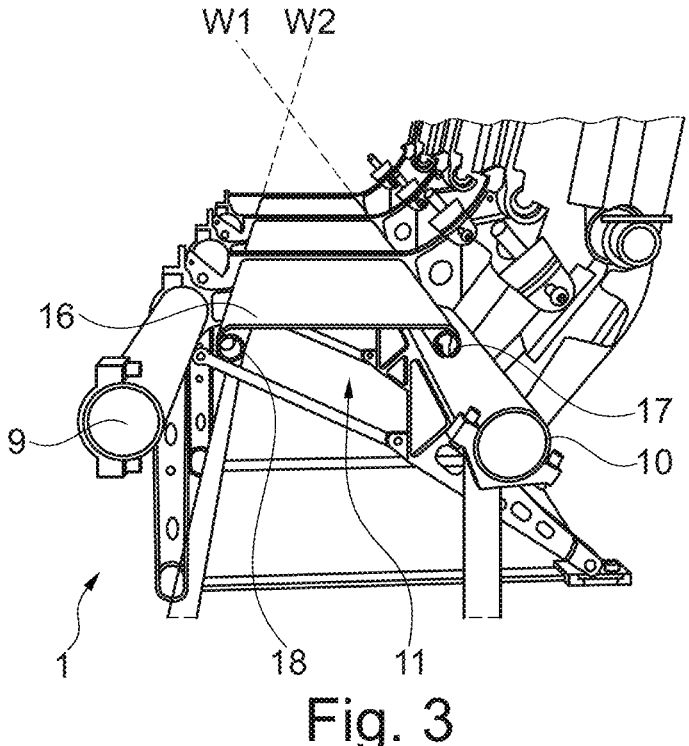
FIG. 3 shows a cut-out of the aircraft passenger seat row according to FIG. 2, wherein components of an aircraft passenger seat of the aircraft passenger seat row are held in a non-visible manner.
Figure 4:
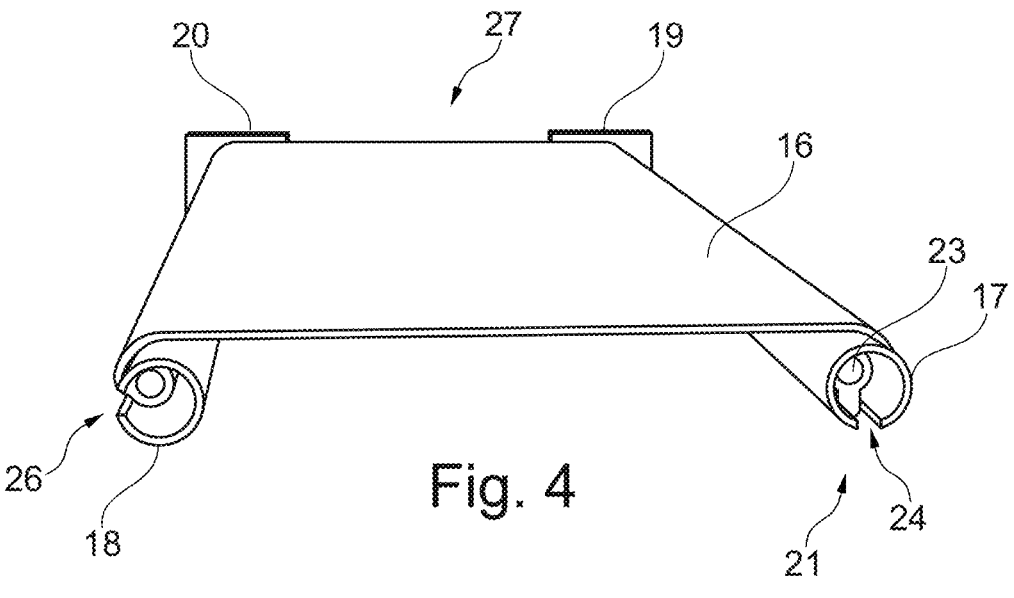
FIG. 4 shows a winding element arranged on winding shafts of a seat face group as a view obliquely from the top side.
Figure 5:
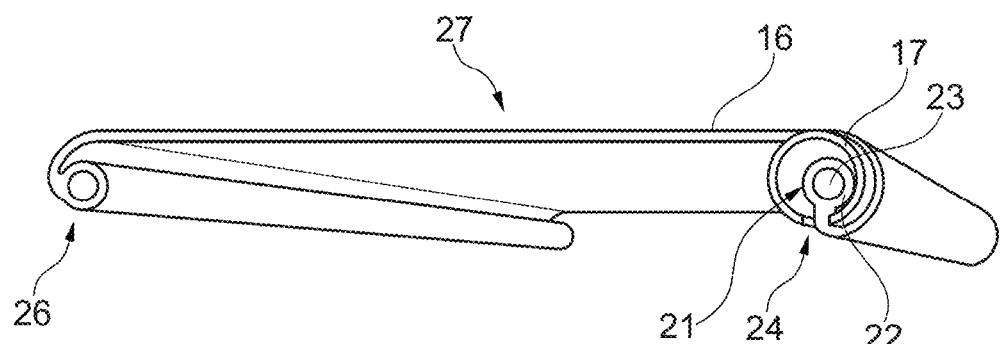
FIG. 5 shows a winding element arranged on a winding shaft or a seat face group as a view obliquely from the bottom side.

FIG. 1 shows an aircraft passenger seat row 1 with aircraft passenger seats 2 to 4. The aircraft passenger seats 2 to 4 have a surround 5. For example, the surround 5 has seat dividers 6, 7, 8 which are connected to each other by means of bars 9, 10. For example, a bar 9 extends along a longitudinal axis L.

For example, an aircraft passenger seat 2 has a seat face group 11 and a backrest element 12 of a backrest 13. For example, the backrest 13 has a housing in the form of a backrest shell 14 and a frame 15.

For example, the seat face group 11 has a winding element 16, a first winding shaft 17 and a second winding shaft 18.

For example, the first winding shaft 17 and/or the second winding shaft 18 are provided in a manner rotatably supported about a first winding axis W1 or a second winding axis W2. It is conceivable for the first winding shaft 17 to be provided to be resiliently loaded by means of a resilient element 25.

For example, the first winding shaft 17 is movably supported on a rotary bearing 19 of the surround 5. It is also conceivable for the second winding shaft 18 to be movably supported on another rotary bearing 20 of the surround 5. However, it is also conceivable for the additional rotary bearing 20 to be secured to the surround 5 in a non-movable manner.

For example, the winding element 16 has at the first end 21 thereof a welt 22. For example, the welt 22 is reinforced by means of a welt strip 23. For example, the welt strip 23 is provided in a rod-like manner, for example, as a rod. For example, the first winding shaft 17 has a slot 24 by means of which the welt 22 can be arranged in a comparatively simple manner on the first winding shaft 17. It is conceivable for the winding element 16 to be configured at the second end 26 thereof in a similar manner to the first end 21.

For example, the winding element 16 extends from the first winding shaft 17 to the second winding shaft 18 along a winding element face 27. For example, a seat face element is secured to the winding element face 27 (not illustrated in FIGS. 1 to 6).

Figure 6:
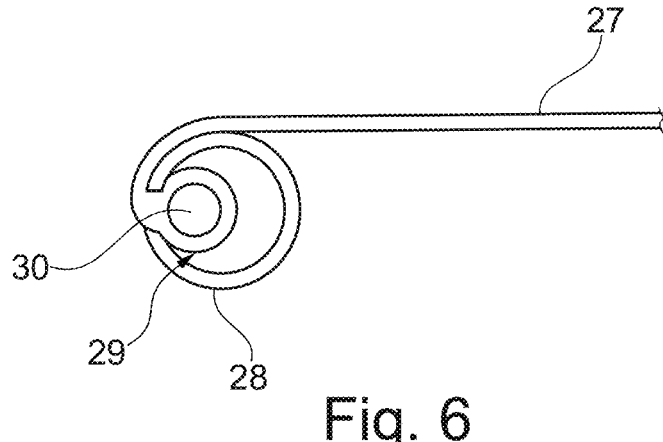
FIG. 6 shows a schematic illustration of an arrangement of a winding element on a winding shaft.

FIG. 6 shows in a cutout a winding element 27 which has at the end thereof a welt 29 and which is arranged on a winding shaft 28. For example, the first winding shaft 28 is in the form of a welt strip. In order to reinforce the winding element 27, in particular the welt 29, a welt strip 30 is provided. By means of the welt strip, the winding element 27 is secured in a direction transverse relative to the longitudinal axis of the first winding shaft 28 on the first winding shaft 28.

Figure 7:
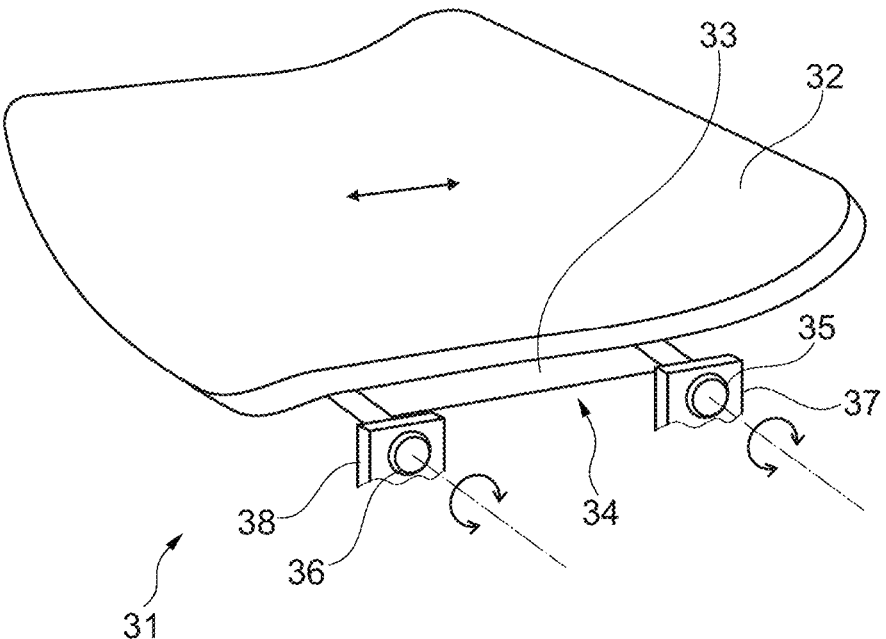
FIG. 7 shows a seat face group as a schematic illustration obliquely from the top side.

FIG. 7 shows a seat face group 31. The seat face group 31 has a seat face element 32 which is secured to a winding element face 33 of a winding element 34 of the seat face group 31. The winding element 34 is secured at a first end to a first winding shaft 35 and at a second end to a second winding shaft 36. For example, the first and the second winding shafts 35, 36 are provided so as to be fixed in position with spacing. For example, the first winding shaft 35 is rotatably supported on a first rotary bearing 37 of an aircraft passenger seat (not shown in FIG. 7) and the second winding shaft 36 is rotatably supported on a second rotary bearing 38 of the aircraft passenger seat.

LIST OF REFERENCE NUMERALS

1 Aircraft passenger seat row
2 Aircraft passenger seat
3 Aircraft passenger seat
4 Aircraft passenger seat
5 Surround
6 Seat divider
7 Seat divider
8 Seat divider
9 Bar
10 Bar
11 Seat face group
12 Backrest element
13 Backrest
14 Backrest shell
15 Frame
16 Winding element 17 Winding shaft
18 Winding shaft
19 Rotary bearing
20 Rotary bearing
21 End
22 Welt
23 Welt strip
24 Slot
25 Resilient element
26 End
27 Winding element
28 Winding shaft
29 Welt
30 Welt strip
31 Seat face group
32 Seat face element
33 Winding element face
34 Winding element
35 Winding shaft
36 Winding shaft
37 Rotary bearing
38 Rotary bearing

The invention claimed is:

1. An aircraft passenger seat comprising a surround, a seat face group and a backrest element, wherein the seat face group has a seat face element, wherein the seat face element provides a seat face, on which a user of the aircraft passenger seat sits directly on, wherein the seat face group has a winding element and a first winding shaft, wherein a first end of the winding element is connected to the first winding shaft, wherein the first winding shaft is provided so as to be able to be rotated about a first winding axis, wherein, when the first winding shaft is rotated about the first winding axis, the winding element is provided in the region of the first end of the winding element so as to be able to be wound on the first winding shaft or to be unwound from the first winding shaft, wherein the seat face element is connected to the winding element so that, when the first winding shaft is rotated, the seat face element is moved, wherein the seat face element is in the form of a seat shell or seat cushion, wherein the seat face element and the winding element are connected to each other in a connection region, wherein the connection region is provided as a face, at which the seat face element and the winding element are adjacent to each other.

2. The aircraft passenger seat as claimed in claim 1, wherein the first winding shaft is formed under the seat face element.

3. The aircraft passenger seat as claimed in claim 1, wherein the winding element is in the form of a cloth or in the form of a strip.

4. The aircraft passenger seat as claimed in claim 1, wherein the first winding shaft has a slot and the winding element is provided in a state pushed onto the slot of the first winding shaft in the form of a tongue and groove connection with the first end of the winding element.

5. The aircraft passenger seat as claimed in claim 1, wherein a spacing of the first winding shaft from a second winding shaft is provided so as to be non-changeable.

6. The aircraft passenger seat as claimed in claim 1, wherein the aircraft passenger seat has a locking element, wherein a movement of the first winding shaft and/or a movement of a second winding shaft can be blocked by the locking element.

7. The aircraft passenger seat as claimed in claim 1, wherein the first winding shaft is provided so as to be able to be rotated about the first winding axis from a starting position into an intermediate position, wherein the aircraft passenger seat has a resilient element, wherein the first winding shaft is acted on by the resilient element with a resilient force of the resilient element so that the first winding shaft can be moved by the resilient force of the resilient element from the intermediate position into the starting position.

8. The aircraft passenger seat as claimed in claim 1, wherein the seat face element is releasably connected to the winding element.

9. The aircraft passenger seat as claimed in claim 1, wherein the seat face element has a seating surface for a user on which the user can sit directly, and the seat face element has a surface opposite and spaced from the seating surface at which the seat face element is connected to the winding element.

10. An aircraft passenger seat comprising a surround, a seat face group and a backrest element, wherein the seat face group has a seat face element, wherein the seat face element provides a seat face, on which a user of the aircraft passenger seat can sit directly, wherein the seat face group has a winding element and a first winding shaft, wherein a first end of the winding element is connected to the first winding shaft, wherein the first winding shaft is provided so as to be able to be rotated about a first winding axis, wherein, when the first winding shaft is rotated about the first winding axis, the winding element is provided in the region of the first end of the winding element so as to be able to be wound on the first winding shaft or to be unwound from the first winding shaft, wherein the seat face element is connected to the winding element so that, when the first winding shaft is rotated, the seat face element is moved, wherein the seat face element is in the form of a seat shell or seat cushion, wherein the seat face element and the winding element are connected to each other in a connection region, wherein the connection region is provided as a face, at which the seat face element and the winding element are adjacent to each other, wherein a second winding shaft is provided so as to be able to be rotated about a second winding axis, wherein the first and the second winding shafts are coupled to each other so that, when the first winding shaft is rotated, as a result of the coupling of the winding shafts a rotation of the second winding shaft is brought about or vice versa.

11. A seat row having an aircraft passenger seat as claimed in claim 1.

12. An aircraft having an aircraft passenger seat as claimed in claim 1.

13. An aircraft having a seat row as claimed in claim 11.

14. An aircraft passenger seat comprising a surround, a seat face group and a backrest element, wherein the seat face group has a seat face element, wherein the seat face element provides a seat face, on which a user of the aircraft passenger seat sits directly on, wherein the seat face group has a winding element and a first winding shaft, wherein a first end of the winding element is connected to the first winding shaft, wherein the first winding shaft is provided so as to be able to be rotated about a first winding axis, wherein, when the first winding shaft is rotated about the first winding axis, the winding element is provided in the region of the first end of the winding element so as to be able to be wound on the first winding shaft or to be unwound from the first winding shaft, wherein the seat face element is connected to the winding element so that, when the first winding shaft is rotated, the seat face element is moved, wherein the seat face element is in the form of a seat shell or seat cushion, wherein the seat face element and the winding element are connected to each other in a connection region, wherein the connection region is provided as a face, at which the seat face element and the winding element are adjacent to each other, and wherein the seat face of the seat face element on which the aircraft passenger sits directly on is located opposite to and not adjacent to the connection region of the seat face element.

* * * * *